Patented Apr. 18, 1939

2,155,010

UNITED STATES PATENT OFFICE 2,155,010

INSECTICIDE

Andrew F. Freeman, Hyattsville, Md.; dedicated to the free use of the People in the territory of the United States No Drawing. Application April 1, 1938,
Serial No. 199,448

1 Claim. (Cl. 167—30)

(Granted under the act of March 3, 1883, as amended April 30, 1938; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

My invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

I have found that N-nitrosodiphenylamine, which may be made by the reaction of diphenylamine and nitrous acid, is effective in killing many species of insects; that it may be sprayed or dusted upon delicate vegetation without injuring it; that it is as effective as lead arsenate and other commonly used insecticides, and that it is relatively non-toxic to warm-blooded animals.

The reaction in preparing this compound is essentially as follows:

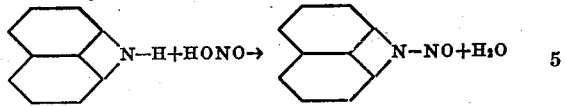

N-nitrosodiphenylamine occurs as pale yellow crystals melting at 67.2–67.6° C. It is insoluble in water, but soluble in organic solvents. The product of the above reaction may be reduced to impalpable powder by grinding and may be applied to vegetation either dry as a dust or wet as a spray. N-nitrosodiphenylamine may also be applied by dissolving it in acetone and pouring the acetone into water. This may be applied directly to plants, or it may be combined with a suitable wetting agent and then sprayed.

The value of N-nitrosodiphenylamine as an insecticide in comparison with lead arsenate and barium fluosilicate is shown by the following tests:

(1) Upon the imported cabbage worm N-nitrosodiphenylamine was at the same concentration as effective as lead arsenate.

(2) Upon the cross striped cabbage worm N-nitrosodiphenylamine was as effective as lead arsenate, and more effective than barium fluosilicate.

(3) Upon the southern army worm N-nitrosodiphenylamine was more effective than barium fluosilicate.

Having thus described my invention, what I claim for Letters Patent is:

An insecticide containing as its essential active ingredient N-nitrosodiphenylamine.

ANDREW F. FREEMAN.